United States Patent

Miyazako et al.

[11] 3,957,492
[45] May 18, 1976

[54] PHOTOGRAPHIC SILVER HALIDE EMULSION COMPRISING AN AMPHOTERIC COPOLYMER

[75] Inventors: Takushi Miyazako; Nobuo Tsuji; Tohru Sueyoshi; Yasuo Inoue, all of Minami-ashigara, Japan

[73] Assignee: Fuji Photo Film Co., Ltd., Minami-ashigara, Japan

[22] Filed: Jan. 7, 1974

[21] Appl. No.: 431,525

[30] Foreign Application Priority Data
Jan. 8, 1973 Japan................... 48-5008

[52] U.S. Cl..................... 96/114; 96/85; 96/87 R
[51] Int. Cl.² ............ G03C 1/72; G03C 1/78
[58] Field of Search............ 96/114, 85, 87 R, 94

[56] References Cited
UNITED STATES PATENTS

| | | | |
|---|---|---|---|
| 3,341,332 | 9/1967 | Nakajima et al. | 96/107 |
| 3,360,373 | 12/1967 | Schaller et al. | 96/114 |
| 3,408,199 | 10/1968 | Saleck et al. | 96/114 |
| 3,429,707 | 2/1969 | Nakajima et al. | 96/87 R |
| 3,713,829 | 1/1973 | Nishio et al. | 96/85 |

*Primary Examiner*—Edward C. Kimlin
*Attorney, Agent, or Firm*—Sughrue, Rothwell, Mion, Zinn & Macpeak

[57] ABSTRACT

A photographic emulsion containing a novel amphoteric copolymer which comprises:

A. 0.5 to 30 mole % of cation-site containing repeating units of the formula (I)

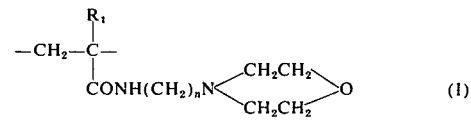

wherein $R_1$ represents a hydrogen atom or a methyl group and $n$ is 1, 2, 3 or 4;

B. 0.5 to 30 mole % of anion-site containing repeating units of the formula (II)

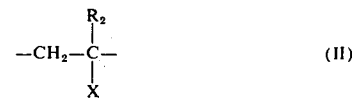

wherein $R_2$ represents a hydrogen atom or a methyl group, and X represents

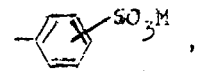

—COOM, —SO$_3$M or —COO(CH$_2$)$_m$SO$_3$M, where M is a cation and $m$ is 3 or 4; and C. the balance of repeating units of the formula (III)

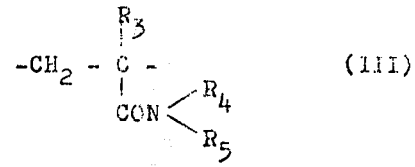

wherein $R_3$ represents a hydrogen atom or a methyl group, $R_4$ and $R_5$ each represents a hydrogen atom or a lower alkyl group or a substituted alkyl group thereof. The novel amphoteric copolymer can be substituted partly or entirely for the gelatin in a photographic emulsion, with excellent photographic effects.

16 Claims, No Drawings

PHOTOGRAPHIC SILVER HALIDE EMULSION COMPRISING AN AMPHOTERIC COPOLYMER

BACKGROUND OF THE INVENTION

1. Field of the Invention

This invention relates to a photographic emulsion, in particular, to a silver halide photographic emulsion containing a novel copolymer.

2. Description of the Prior Art

Gelatin is widely used as a protective colloid as well as halogen acceptor and retainer in the manufacture of silver halide photographic emulsions. In addition, gelatin has an excellent gel-forming action. On the other hand, however, gelatin which is a natural substance, has disadvantages in that an emulsion of uniform quality cannot be obtained using gelatin due to a small amount of impurities contained in the gelatin and due to decay of the gelatin during storage thereof. In addition, gelatin tends to be hydrolyzed during the manufacture of silver halide emulsions and the resulting hydrolyzed product affects the properties of the emulsions formed. Therefore, it is difficult to manufacture photographic materials of uniform quality using gelatin. In the manufacture of silver halide photographic materials, some attempts have already been effected to try to substitute a part or all of the gelatin with other synthetic products (for example as disclosed in Japanese Pat. No. 164,435; Japanese Patent Publication No. 7561/68; British Pat. No. 788,343; U.S. Pat. No. 2,811,494, etc.). In the prior art, however, it has been extremely difficult to manufacture synthetic products which have excellent gelation effects and which have the protective colloid qualities equal to gelatin. In addition, it also is difficult to manufacture synthetic products which are stable to pH variations during manufacture of silver halide emulsions. A large number of polymers are used as additives for gelatin, but they are necessarily limited to those which are compatible with gelatin. However, when a large amount of such a synthetic product is used, a hazed mixture is manufactured, or a reticulated film is formed after drying of the emulsion. In addition, when a mixture of a synthetic product and gelatin is used, the polymer tends to separate from the emulsion formed with variations in the pH thereof, or a hazed film is formed. On these grounds, the manufacture of synthetic products that are stable to pH variations, even after a part or all of the gelatin is substituted by such product, has been earnestly desired. In addition, it also is desired that these synthetic products be used in the manufacture of photographic films and papers and in silver halide emulsion layers, filter layers, intermediate layers, etc.

SUMMARY OF THE INVENTION

Therefore, a first object of this invention is to provide novel copolymers having excellent photographic characteristics, by which a part or all of the gelatin in a photographic emulsion can be replaced.

A second object of this invention is to provide copolymers which are stable to pH variations in the manufacture of photographic emulsions.

A third object is to provide copolymers having better excellent compatibility with gelatin than conventional synthetic products.

A fourth object is to provide amphoteric and hydrophilic copolymers by the copolymerization of at least three or more kinds of vinyl compounds.

A fifth object is to provide copolymers having an excellent function as protective colloid, which do not cause any fog in the manufacture of emulsions.

A sixth object is to provide photographic materials which can utilize these copolymers.

These objects of this invention can be attained utilizing a photographic emulsion containing an amphoteric copolymer comprising:

A. 0.5 to 30 mole %, preferably 1.0 to 20 mole %, of a cation-site containing repeating unit of the formula (I)

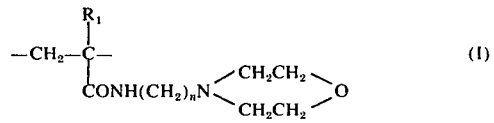

wherein $R_1$ represents a hydrogen atom or a methyl group, and $n$ is 1, 2, 3 or 4;

B. 0.5 to 30 mole %, preferably 1.0 to 20 mole %, of an anion-site containing repeating unit of the formula (II)

wherein $R_2$ represents a hydrogen atom or a methyl group, and X represents

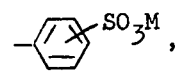

—COOM, —$SO_3M$ or —COO($CH_2$)$_m SO_3M$, where M is a cation and $m$ is 3 or 4; and C. the balance of a repeating unit of the formula (III)

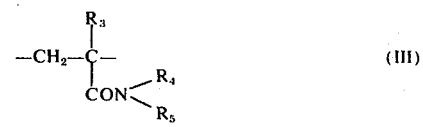

wherein $R_3$ represents a hydrogen atom or a methyl group, and $R_4$ and $R_5$ each represents a hydrogen atom or a lower alkyl group or a substituted alkyl group thereof.

DETAILED EXPLANATION OF THE INVENTION

Suitable lower alkyl groups represented by $R_4$ and $R_5$ are those having 1 to 4 carbon atoms, such as methyl, ethyl, propyl and butyl groups. As a substituted alkyl groups represented by one of $R_4$ and $R_5$, groups such as hydroxy, halogen, alkoxy, aryl, alkoxycarbonyl, oxo, acyloxy, acyl, acylamino, cyano, etc. However, when one of $R_4$ and $R_5$ is a group containing a tertiary carbon atom attached to the N atom of —CON— moiety, for example, groups such as

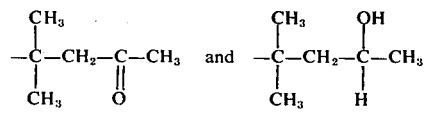

the other of $R_4$ or $R_5$ is a hydrogen atom. M is preferably a hydrogen ion or an alkali metal ion such as a sodium, potassium or lithium ion, or ammonium ion. The cation-site can be used in the free form thereof or after neutralization with hydrochloric acid, nitric acid, sulfuric acid phosphoric acid, acetic acid, oxalic acid, propionic acid, benzene sulfonic acid, phthalic acid, lactic acid, or the like. In addition, the cation-site can also be used in the form of a quaternary salt with a quaternizing agent such as a sulfonate e.g., methyl p-toluenesulfonate methyl benzene sulfonate, etc., an alkyl halide such as methyl iodide, ethyl bromide, propyl chloride, benzyl bromide, etc., or can further be used in the form of a betaine with monochloroacetic acid, $\beta$-chloropropionic acid, propanesultone or the like, e.g., the N-atom of the morpholine group forming an intramolecular quaternary salt with a pendant anion site such as carboxyalkyl, sulfoalkyl group.

Representative examples of amphoteric copolymers of this invention are, for example, as follows: N-(morpholinylmethyl)-acrylamido-acrylamido-acrylic acid, N-(morpholinylmethyl)acrylamido-acrylamido-methacrylic acid, N-(morpholinylmethyl)acrylamido-acrylamido-N,N-dimethylacrylamido-acrylic acid, N-acrylamido-methylmorpholinyl-$\beta$-aminopropionate-betaine-methacrylamido-acyclic acid, N-(morpholinylmethyl)methacrylamido-acrylamido-acrylic acid, N-(morpholinylmethyl)methacrylamido-methacrylamido-acrylic acid, N-(morpholinylmethyl)methacrylamido-N,N-dimethyl-methacrylamido-acrylic acid-N-methacrylamidomethyl, N-methylmorpholinyl-p-toluenesulfonate-acrylamido-acrylic acid N-(2-morpholinylethyl)acrylamido-acrylamido-acrylic acid, N-(2-morpholinylethyl)acrylamido-acrylamido-methacrylic acid, N-acrylamidoethylmorpholinyl-$\beta$-aminoacetate-betain-methacrylamido-acrylic acid, N-(3-morpholinylpropyl)acrylamido-acrylamido-acrylic acid, N-(3-morpholinylpropyl)acrylamido-acrylamido-methacrylamido-methacrylic acid, N-(3-morpholinylpropyl)acrylamido-acrylamido-N,N-dimethylacrylamido-acrylic acid, N-(3-morpholinylpropyl)acrylamido-N-(2-hydroxyethyl)acrylamido-acrylamido-methacrylic acid, N-(3-morpholinylpropyl)acrylamido-N-(1,1-dimethyl-3-hydroxybutyl)acrylamido-acrylamido-acrylic acid, etc.

Copolymers of this invention exhibit the properties of a hydrophilic and amphoteric electrolyte and have excellent properties as a protective colloid. Therefore, solutions of these copolymers are extremely stable to pH variation and also are extremely highly compatible with gelatin. In addition, since they are different from conventional synthetic products, the copolymers of this invention can be admixed with gelatin in various proportions over a broad range and mixtures of various proportions can practically be utilized. In admixture with gelatin, it is preferred that the amount of the copolymer be 5 to 70% by weight of the total amount of mixture. Accordingly, it has now become possible to manufacture emulsion films without any haze or reticulation by the use of the copolymers of this invention, these films being quite different from all other conventional films. When conventional synthetic products are used in place of gelatin for manufacture of photographic emulsions, it is difficult to manufacture practically useful photographic emulsions since these conventional products often cause the occurrence of fog. Whereas, it has now become possible to manufacture emulsions with very little fog, by the use of the copolymers of this invention.

The molecular weight of copolymer to be used in this invention is preferably in the range of about 10,000 to 1,000,000. If the molecular weight is too low, the viscosity of the copolymer is too low during the manufacture of the emulsion, and on the contrary, if the molecular weight is too high, the compatibility of the copolymer with gelatin becomes poor. In particular, copolymers having a molecular weight in the range of about 50,000 to 500,000 are most preferred.

The basic starting material monomers which can be used in the synthesis of the copolymers of this invention can be synthesized according to the method described in U.S. Pat. No. 2,649,438 or from an N-aminoalkyl-morpholine and an acrylic acid chloride or methylol acrylamide (as disclosed in to Makromol Chemie, Vol. 57, 1962, page 27), or the like. Suitable monomers are represented by the following formula (Ia):

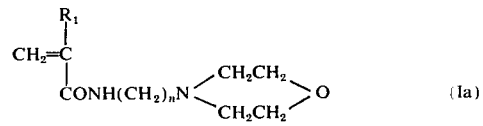

wherein $R_1$ represents a hydrogen atom or a methyl group and $n$ is an integer of 1, 2, 3 or 4. The nitrogen atom bonded as a part of the morpholine nucleus can be a tertiary nitrogen atom or can also be in the form of a quaternary salt or a betaine. Representative examples of monomers are, for example, as follows: N-morpholinylmethylacrylamide, N-morpholinylmethylmethacrylamide, N-morpholinylethylacrylamide, N-morpholinylethylmethacrylamide, N-morpholinylpropylacrylamide and N-morpholinylpropylmethacrylamide.

Some embodiments to more specifically illustrate the synthesis of basic starting material monomers will be given hereunder. In these examples and those to follow, all parts, percents, ratios and the like are by weight.

1. Synthesis of N-Morpholinylmethylacrylamide

In a 300 cc capacity round bottom flask equipped with a stirrer were put 50.5 g (0.5 mole) of N-methylolacrylamide and 50 cc of water and, as a polymerization-inhibitor, 500 mg of hydroquinone. On the other hand, 43 g (0.5 mole) of morpholine were gradually added thereto while stirring. Afterwards, the entire contents were stirred for 1 hour at 50° to 60°C. The reaction product was concentrated and then recrystallized from ethyl acetate. m.p.; 91°–92°C. In addition, the resulting product was further distilled under reduced pressure to obtain 34.5 g of fraction of 140°–160°C/0.01 mmHg (45.7%).

Elementary Analysis:

|   | Measured | Calculated |
|---|----------|------------|
| H | 8.04     | 8.29       |
| C | 52.96    | 56.45      |
| N | 16.01    | 16.46      |

2. Synthesis of N-Morpholinylmethylmethacrylamide

In a 300 cc capacity round bottom flask equipped with a stirrer were put 57.5 g (0.5 mole) of N-methylolmethacrylamide and 50 cc of water and, as a polymerization inhibitor, 500 mg of hydroquinone. On the other hand, 43 g (0.5 mole) of morpholine were gradually added thereto while stirring. Afterwards, the contents were stirred for 1 hour at 50°–60°C. Finally, the reaction mixture was concentrated and then was recrystallized from ethyl acetate. m.p.; 78.0°C. Yield: 48.3 g (52.5%).

| Elementary Analysis: | Measured | Calculated |
|---|---|---|
| H | 8.33 | 8.75 |
| C | 56.84 | 58.67 |
| N | 14.69 | 15.21 |

3. Synthesis of N-2-Morpholinylethylacrylamide

In a 1 liter capacity round bottom flask equipped with a stirrer were put 90.5 g (1.0 mole) of acrylic acid chloride and 250 cc of acetonitrile and, as a polymerization-inhibitor, 0.5 g of hydroquinone, and the contents were cooled to 5°–10°C, and thereafter, 130 g (1.0 mole) of 2-morpholinoethylamine were added dropwise thereto in the course of 3 hours while stirring. Afterwards, the contents were stirred further for 2 hours at 40°–50°C. Next, the temperature of the reaction mixture was reduced to 15°–30°C and a solution of 40 g of sodium hydroxide in 100 cc of water was added thereto and the mixture then was stirred for 30 minutes. After removal of the sodium chloride which separated, 97.0 g (52.7%) of a fraction of 122°–124°C/0.05 mmHg were obtained.

| Elementary Analysis: | Measured | Calculated |
|---|---|---|
| H | 8.50 | 8.75 |
| C | 58.21 | 58.67 |
| N | 14.96 | 15.21 |

4. Synthesis of N-(3-Morpholinopropyl)acrylamide

In a 1 liter capacity round bottom flask equipped with a stirrer were put 90.5 g (1.0 mole) of acrylic acid chloride and 300 cc of acetonitrile and, as a polymerization inhibitor, 0.5 g of hydroquinone, and then, after the contents were cooled to 5°–10°C, 143 g (1.0 mole) of 3-morpholinopropylamine was added dropwise thereto over the course of 3.5 hours while stirring. Afterwards, the reaction mixture was stirred additionally for 2 hours at 40°–50°C. Next, a solution of 40 g of sodium hydroxide in 100 cc of water was added thereto and then the mixture was stirred for 30 minutes. After removal of the sodium chloride which separated, 152 g (77.0%) of a fraction of 144°–146°C/0.1 mmHg were obtained.

| Elementary Analysis: | Measured | Calculated |
|---|---|---|
| H | 9.38 | 9.15 |
| C | 59.02 | 60.58 |
| N | 13.82 | 14.13 |

Other monomers can also be synthesized in accordance with the above-described methods. As acrylamide (or derivatives thereof), commercially available acrylamide, methacrylamide or derivatives thereof can be used as such or after recrystallization or after distillation under reduced pressure. Representative examples of acrylamide derivatives which can be used are, for example, as follows: N,N-dimethylacrylamide, N,N-diethylacrylamide, N-isopropylacrylamide, diacetoneacrylamide, N-(1,1-dimethyl-3-hydroxybutyl)acrylamide or N,N-di-n-butylacrylamide, N-(2-hydroxyethyl)acrylamide, etc. The hydrophilic character of the polymers is markedly reduced with an increase in the number of carbon atoms of the acrylamides, and therefore, it is preferred to use those acrylamides as having 8 or less carbon atoms. Of these, the most preferable monomer is acrylamide per se.

Suitable examples of monomers which can be used to provide the anion-site containing repeating unit, component (B) in the amphoteric polymers of the invention are sodium vinyl benzene sulfonate, potassium vinyl benzene sulfonate, sodium acrylate, potassium acrylate, lithium acrylate, sodium methacrylate, potassium methacrylate, sodium itaconate, sodium vinyl sulfonate, sodium sulfopropylacrylate, potassium sulfobutylmethacrylate, etc.

The amphoteric copolymers of this invention can be prepared by copolymerizing the above-described monomer with other monomers (for example, acrylamide derivatives). The copolymerization in preparing such amphoteric copolymers will be explained hereunder in greater detail.

As a polymerization solvent, water, methanol, ethanol, acetone, dimethylformamide or the like can be used, and of these solvents, water is recommended as the most effective solvent. If the concentration of each of the three kinds of monomers to be copolymerized is too low, the yield of copolymer formed tends to be lower, or on the contrary, if the concentration is too high, gelation tends to occur. Therefore, the concentration is most preferably in the range of about 10 to 30% by weight of the solvent employed.

As peroxides which can be used as a polymerization initiators (catalyst), peroxides such as hydrogen peroxide, persulfates such as potassium persulfate, ammonium persulfate, perphosphates such as potassium perphosphate, azo compounds such as azoisobutyronitrile, etc., can be illustrated, and among them, potassium persulfate is the most advantageous. It is preferred to use isopropanol to control the molecular weight of the polymer formed. That is, when the amount of isopropanol added increases, the molecular weight of polymer decreases, and on the contrary, when the amount is decreased, the molecular weight increases. The amount of isopropanol is suitable in the range of 0.5 to 20% by volume based on the volume of the water. A suitable amount of the catalyst ranges from about 0.1 to 15 wt.% based on the total amount of the monomer.

The copolymers of this invention can be synthesized, generally, as follows: (Other polymers which are not specifically exemplified in the following explanation can be synthesized in a similar manner in accordance with any one of the following methods and by application of conventional techniques in the polymer synthetic chemistry field.)

Monomers (starting materials) are put in a reactor, and if necessary, the pH thereof is adjusted to 7–8. After purging the reactor with nitrogen, the contents are heated in a nitrogen atmosphere to about 70°–90°C and stirred for about 2 to 5 hours. (If necessary, sodium hydroxide can be afterwards added to hydrolyze the acrylamides. In this addition, an appropriate amount of sodium hydroxide can selectively be added correspondingly to the acrylic acid content of copolymer to be manufactured, when a copolymer having a desired acrylic acid content is to be manufactured. Next, nitric acid is added until the pH of the reaction system becomes 6.0) If purification is necessary, the product is enveloped in a cellophane film and is dialyzed in distilled water for one night, and then is lyophilized.

Next, the synthesis of representative copolymers is specifically shown, but the present invention is in no way whatsoever limited to only these copolymers. (The intrinsic viscosity of the polymer is measured in a 1% sodium chloride aqueous solution at 30°C.)

In the following Table 1 the respective repeating units of each of copolymers of this invention and comparative copolymers are shown.

Table 1

| Copolymer | Component (B) Anion-site Containing Repeating Unit | Component (C) Acrylamide Repeating Unit | Component (A) Cation-site Containing Repeating Unit |
|---|---|---|---|
| II-1 (for comparison) | $-(CH_2CH)_{10}-$ <br> $\|$ <br> $COOH$ | $-(CH_2CH)_{90}-$ <br> $\|$ <br> $CONH_2$ | |
| II-2 (for comparison) | $-(CH_2CH)_{10}-$ <br> $\|$ <br> $COOH$ | $-(CH_2CH)_{85}-$ <br> $\|$ <br> $CONH_2$ | $-(CH_2CH)_5-$ <br> $\|$ <br> $COOCH_2CH_2N(C_2H_5)_2$ |
| III | $-(CH_2CH)_{10}-$ <br> $\|$ <br> $COOH$ | $-(CH_2CH)_{85}-$ <br> $\|$ <br> $CONH_2$ | $-(CH_2CH)_5-$ <br> $\|$ <br> $CONHCH_2N\!\!<\!\!\bigcirc\!\!O$ (morpholino) |
| IV | $-(CH_2CH)_{10}-$ <br> $\|$ <br> $COOH$ | $-(CH_2CH)_{85}-$ <br> $\|$ <br> $CONH_2$ | $-(CH_2C(CH_3))_5-$ <br> $\|$ <br> $CONHCH_2N\!\!<\!\!\bigcirc\!\!O$ |
| V | $-(CH_2CH)_{10}-$ <br> $\|$ <br> $COOH$ | $-(CH_2CH)_{85}-$ <br> $\|$ <br> $CONH_2$ | $-(CH_2CH)_5-$ <br> $\|$ <br> $CONH(CH_2)_2N\!\!<\!\!\bigcirc\!\!O$ |
| VI | $-(CH_2CH)_{10}-$ <br> $\|$ <br> $COOH$ | $-(CH_2CH)_{85}-$ <br> $\|$ <br> $CONH_2$ | $-(CH_2CH)_5-$ <br> $\|$ <br> $CONH(CH_2)_3N\!\!<\!\!\bigcirc\!\!O$ |
| VII | $(CH_2CH)_{10}$ <br> $\|$ <br> $COOH$ | $-(CH_2CH)_{60}-,-(CH_2CH)_{25}-$ <br> $\|$ $\qquad$ $\|$ <br> $CONH_2$ $\quad$ $CON(CH_3)_2$ | $-(CH_2CH)_5-$ <br> $\|$ <br> $CONH(CH_2)_2N\!\!<\!\!\bigcirc\!\!O$ |
| VIII | $-(CH_2CH)_5-$ <br> $\|$ <br> $COOH$ | $-(CH_2CH)_{60}-,-(CH_2C(CH_3))_{25}-$ <br> $\|$ $\qquad$ $\|$ <br> $CONH_2$ $\quad$ $CONH_2$ | $-(CH_2CH)_{10}-$ <br> $\|$ <br> $CON(CH_2)_2\overset{\oplus}{N}\!\!<\!\!\bigcirc\!\!O$ <br> $CH_3\!\!-\!\!\bigcirc\!\!-\!SO_3^{\ominus}$ (with N-CH_3) |
| IX | $-(CH_2C(CH_3))_5-$ <br> $\|$ <br> $COOH$ | $-(CH_2CH)_{50}-,-(CH_2CH)_{35}-$ <br> $\|$ $\qquad$ $\|$ <br> $CONH_2$ $\quad$ $CON(CH_3)_2$ | $-(CH_2CH)_{10}-$ <br> $\|$ <br> $CONH(CH_2)_3\overset{\oplus}{N}\!\!<\!\!\bigcirc\!\!O$ <br> (with $CH_2CH_2COOH$) $Cl^{\ominus}$ |

Manufacture Example 1 (Copolymer -III)

In a 2 liter capacity round bottom flask equipped with a stirrer were put 8.5 g (0.05 mole) of N-(morpholinomethyl)-acrylamide and 500 cc of water, and 60% nitric acid was then added thereto while stirring, until the pH of the reaction system became 6.0. Next, 60.5 g (0.85 mole) of acrylamide, 7.2 g (0.1 mole) of acrylic acid and 30 cc of isopropanol and, as a catalyst, 400 mg of potassium persulfate were added and the atmosphere is replaced by nitrogen. Thereafter, the contents were heated to 70°–90°C and stirred for 3 hours. The product was enveloped in a cellophane film and was dialyzed in flowing water for one night, and then was lyophilized. The yield of the product was 68.4 g (89.5%) and the intrinsic viscosity thereof was 0.65.

Manufacture Examples 2 – 4

60.5 g (0.85 mole) of acrylamide and 7.2 g (0.1 mole) of acrylic acid and 9.2 g (0.05 mole) of N-(morpholinomethyl)methacrylamide, 9.2 g (0.05 mole) of N-(2-morpholinoethyl)methacrylamide or 9.9 g (0.05 mole) of N-(3-morpholinopropyl)acrylamide were used to prepare the following Copolymers IV, V and VI, in a manner similar to the above Manufacture Example 1. The results obtained are shown in the following Table II.

Table II

| Manufacture Example | Copolymer | Yield (g) | Yield (%) | Intrinsic Viscosity |
|---|---|---|---|---|
| 2 | Copolymer IV | 66.7 | 86.9 | 0.60 |
| 3 | Copolymer V | 72.8 | 94.6 | 0.74 |
| 4 | Copolymer VI | 75.3 | 98.2 | 0.81 |

Manufacture Example 5 (Copolymer VII)

In a 2 liter capacity round bottom flask were put 9.2 g (0.05 mole) of N-(2-morpholinoethyl)acrylamide and 500 cc of water, and 60% nitric acid was then added thereto while stirring, until the pH of the reaction system became 6.0. Next, 42.6 g (0.6 mole) of acrylamide, 24.8 g (0.25 mole) of N,N-dimethylacrylamide, 7.2 g (0.1 mole) of acrylic acid and 40 cc of isopropanol and, as a catalyst, 400 mg of potassium persulfate were added and the atmosphere was replaced by nitrogen, and thereafter the entire contents were heated to 70°–90°C and stirred for 4 hours. The product was enveloped in a cellophane film and was dialyzed in flowing water for one night and then was lyophilized. The yield of the product was 82.1 g (98.0%) and the intrinsic viscosity thereof was 0.69.

Manufacture Example 6 (Copolymer VIII)

18.4 g (0.1 mole) of N-(2-morpholinoethyl)acrylamide, 50 cc of ethanol and 18.5 g (0.1 mole) of methyl p-toluenesulfonate were put in a reactor and stirred for 1 hour at 60°–70°C. 3.6 g (0.05 mole) of acrylic acid, 42.6 g (0.6 mole) of acrylamide, 21.2 g (0.25 mole) of methacrylamide, 500 cc of water and 10 cc of isopropanol and the above reaction solution of the quaternary salt which had previously been reacted were put in a 2 liter capacity reactor, and finally, 500 mg of potassium persulfate were added thereto as a catalyst. Afterwards, the atmosphere was replaced by nitrogen and the entire contents were stirred for 4 hours at 70°–80°C. The product was enveloped in a cellophane film and was dialyzed in flowing water for one night, and then was lyophilized. The yield of the product was 95.3 g (91.2%) and the intrinsic viscosity thereof was 0.77.

Manufacture Example 7 (Copolymer IX)

19.8 g (0.1 mole) of N-(3-morpholinopropyl)acrylamide, 50 cc of ethanol and 10.9 g (0.1 mole) of β-chloro-propionic acid were put in a reactor and stirred for 4 hours at 80°C. 4.3 g (0.05 mole) of methacrylic acid, 35.5 g (0.5 mole) of acrylamide, 34.7 g (0.35 mole) of N,N-dimethylacrylamide, 500 cc of water and 10 cc of isopropanol and the above solution of betaine type monomer which had previously been reacted were put in a 2 liter capacity reactor, and finally, 500 mg of potassium persulfate were added thereto as a catalyst. After the atmosphere was replaced by nitrogen, the entire contents were stirred for 4 hours at 70°–90°C. The product was enveloped in a cellophane film and dialyzed in flowing water for one night, and then was lyophilized. Yield: 98.2 g (93.0%).

Manufacture Example 8 (Copolymer II-1 for comparison)

In a 2 liter capacity reactor were put 7.2 g (0.1 mole) of acrylic acid, 63.9 g (0.9 mole) of acrylamide, 500 cc of water and 40 cc of isopropanol and, as a catalyst, 350 mg of potassium persulfate, and the atmosphere was replaced by nitrogen, and thereafter, the entire contents were stirred for 3 hours at 80°–90°C. The reaction product was re-precipitated in excess methanol and dried in a vacuum. The yield of the product was 70.4 g (99.0%), and the intrinsic viscosity thereof was 0.13.

Manufacture Example 9 (Copolymer II-2 for comparison)

In a 2 liter capacity reactor were put 8.6 g (0.05 mole) of N,N-diethylaminoethylacrylate and 500 cc of water, and 60% nitric acid was then added thereto while stirring until the pH of the reaction system became 6.0. Next, 60.5 g (0.85 mole) of acrylamide, 7.2 g (0.1 mole) of acrylic acid and 30 cc of isopropanol and, as a catalyst, 400 mg of potassium persulfate were added and the atmosphere was replaced by nitrogen. Thereafter, the entire contents were heated to 70°–90°C and stirred for 4 hours. The product was enveloped in a cellophane film and dialyzed in flowing water for one night, and then was lyophilized. The yield of the product was 74.8 g (97.1%) and the intrinsic viscosity thereof was 0.72.

The intrinsic viscosity of the amphoteric copolymers of this invention preferably ranges, in general, from about 0.3 to 5 or so, more preferably from 0.5 to 2.5 or so, as measured in a 1% sodium chloride aqueous solution at 30°C.

The copolymers of this invention can be used in silver halide emulsions and further, can also be used in other photographic layers such as a filter layer for an intermediate layer, a subbing layer, etc. When these copolymers are used in silver halide emulsions, it is desired that they be used together with other hydrophilic colloids having a gel forming action such as gelatin. Preferred hydrophilic colloids are, for example, gelatin, albumin, collodion, gum arabic, agar, cellulose derivatives (alkyl esters of carboxy cellulose, hydroxyethyl cellulose, carboxymethyl-hydroxyethyl cellulose, etc.), synthetic resins (polyvinyl alcohol, polyvinyl pyrrolidone, etc.) and other colloids known in this art. Photosensitive layers can be prepared by applying an aqueous solution containing coating auxiliaries such as saponin, sodium alkylbenzene-sulfonate, polyoxyethylenealkylphenylether or the like, on a support. For the purpose of increasing the strength of the emulsion layer, formaldehyde, mucochloric acid, chlorotriazine derivatives or like compounds can be added as a hardening agent for the colloid binder. In the present invention, the content of each of the copolymer, the hydrophilic colloid, the hardener and the coating auxiliary can be changed over a broad range, in accordance with the quality and use requirements of the photographic materials. The optimum amount of each can easily be determined by those skilled in the art on the basis of conventional knowledge and techniques.

The photosensitive silver halide which can be used in the present invention can be anyone of silver chloride, silver bromide, silver bromochloride, silver bromoiodide, silver bromoiodochloride, etc., and when silver bromoiodide is used, the content of iodine is preferably 0.5 to 10 mole %. The particle size of the silver halide is preferably 0.05 to 3 $\mu$. However, this range is only preferred and is not limitative.

The support of the present invention can be any support which is generally used in the photographic field, and, for example, cellulose acetate, cellulose propionate, polyester, polystyrene, polypropylene, paper or polyethylene coated paper, etc., can be employed.

Silver halide emulsion can be sensitized using conventional methods with a sensitizer (such as a chemical sensitizer, a spectral sensitizer). More precisely, any sensitizing method such as sulfur sensitization with a labile sulfur compound; noble metal sensitization with a compound of noble metal such as platinum, palladium, iridium, etc.; reduction sensitization with sulfuric acid, hydrazine, stannous chloride, etc.; silver digestion in the presence of excess silver ion; and selenium sensitization with a labile selenium compound, or a combination of these treatments can be employed. The photographic emulsion of this invention can contain conventional additives which can be easily selected by those skilled in the art, such as sensitizers, stabilizers, anti-fogging agents, surfactants, plasticizers, development accelerators, color couplers, ultraviolet ray absorbents, fluorescent whitening agents, hydrophilic polymer latexes (as disclosed in Japanese Patent Publication Nos. 5819/70 and 5351/70), antiirradiation dyes, matting agents, antistatic agents, etc. The above sensitizers include ethyleneoxide compounds, quaternary ammonium salts and the like. The above antifogging agents and stabilizers include tetrazaindene, mercaptotriazole, mercaptotetrazole, thiadiazole, aminotriazole, benzthiazole, benzimidazole, benztriazole and derivatives thereof, as well as organic mercury compounds, iodates, iodonium compounds, and the like which are generally used as anti-fogging agents in conventional photographic emulsions. The above color coupler can be anyone of the water-soluble coupler and oil-soluble coupler emulsified dispersions. The photographic materials of this invention can be color-developed.

In the copolymer of this invention, the amido bond is positioned in a side chain, and, therefore, if the side chain is removed due to physical and/or chemical changes, the degree in the reduction of the molecular weight is small. Accordingly, the photographic properties of photographic materials containing the present copolymer are barely affected due to physical and/or chemical changes. On the contrary, gelatin contains an amido bond in the main chain, and so the molecular weight thereof is markedly reduced after hydrolysis due to pH changes or the like.

Now, the present invention will be explained in greater detail by reference to the following Examples, which, however, are not to be interpreted as limiting the scope of the present invention.

EXAMPLE 1

| Solution I: | |
|---|---|
| Protective Colloid | 10 g |
| KBr | 90 g |
| KI | 30 g |
| $H_2O$ | 1 liter |
| Solution II: | |
| $AgNO_3$ | 100 g |
| $H_2O$ | 1 liter |

Solution I containing each of the compounds (protective colloids) shown in the following Table 3 was heated to 60°C and stirred, and Solution II was added thereto over the course of 30 minutes while stirring. The addition was carried out at a constant speed and the temperature of reaction solution was kept at 60°C during the addition. The average particle size of the thus prepared silver halide crystals was about 0.5 $\mu$. After completion of the reaction, the soluble salts were removed according to the method as described in U.S. Pat. No. 2,614,928. That is, after completion of the reaction, 10 g of gelatin phthalide was added and dissolved, and afterwards, the temperature of the reaction system was reduced to 40°C and the pH thereof was decreased to 3.80 with 2 wt% sulfuric acid, whereupon the silver halide dispersion was precipitated. Water at 40°C was added to the precipitates after washing with water, until the volume became the original volume (2 liters), and then 100 g of inert gelatin were added thereto. Thereafter, the pH of the system was increased to 6.5 with 1N sodium hydroxide thereby to re-disperse the precipitates. The thus re-dispersed emulsion was subjected to chemical digestion for 30 minutes at 60°C with 5 mg of hypo and 1 mg of potassium aurate tetrachloride each per 1 mole of silver halide. The respective emulsion was subjected to spectral sensitization with 3,3'-diethyl-9-methyl-thiacarbocyanine, and 0.6 g of 4-hydroxy-6-methyl-1,3,3a,7-tetrazaindene per 1 mole of silver halide was added thereto and further, saponin was added to the emulsion in an amount of 10.5 g as a coating auxiliary. Afterwards, the resulting emulsion was applied to a triacetate film, the silver content being 15 mg/100 cm². The thus formed photographic film after coating and drying was exposed through a continuous wedge using a sensitometer, and then developed in the following developer for 10 minutes at 20°C.

| Developer: | |
| --- | --- |
| N-Methyl-p-aminophenol Sulfate | 22 g |
| Hydroquinone | 88 g |
| Anhydrous Sodium Sulfite | 98 g |
| Anhydrous Sodium Carbonate | 48 g |
| Potassium Bromide | 5 g |
| Water to make | 1 liter |

After being washed with water, the film was treated in the following fixing solution for 10 minutes at 20°C and then again washed with water.

| Fixing Solution: | |
| --- | --- |
| Sodium Thiosulfate | 200 g |
| Borax | 10 g |
| Water to make | 1 liter |

Sensitometry was carried out on each of the thus prepared specimens according to a conventional method to obtain values for photographic sensitivity and fog of each of the respective specimens. The results obtained are shown in the following Table 3.

Table 3

| Specimen | Protective Colloid | Relative Sensitivity* | Fog |
| --- | --- | --- | --- |
| Control | Inert Gelatin | 100 | 0.12 |
| 1 | Copolymer III | 115 | 0.13 |
| 2 | Copolymer IV | 118 | 0.12 |
| 3 | Copolymer V | 122 | 0.09 |
| 4 | Copolymer VI | 130 | 0.10 |
| Comparison | Copolymer II-1 | — | 0.60 (particles flocculated) |
| Comparison | Copolymer II-2 | 70 | 0.53 (particles flocculated) |

*The relative sensitivity is represented in relation to the sensitivity of inert gelatin-containing emulsion set at 100.

As is apparent from the results contained in Table 3 above, the sensitivity of every emulsion containing the copolymer of the present invention is higher than that of the control emulsion, while the degree of fog of the emulsion of the present invention is almost the same as that of control emulsion. On the other hand, the emulsions containing comparative copolymers are poor in compatibility with gelatin and the emulsified particles therein tend to easily flocculate, and thus the sensitivity of the comparative emulsions is low.

EXAMPLE 2

| Solution I: | |
| --- | --- |
| Inert Gelatin | 5 g |
| Copolymer VII | 5 g |
| KI | 3.0 g |
| KBr | 90.0 g |
| H₂O | 1 liter |
| Solution II: | |
| AgNO₃ | 100 g |
| H₂O | 1 liter |

Solution I was added to Solution II in a manner similar Example 1, and the other treatments were the same as those of Example 1 to prepare specimen No. 5, which was then subjected to sensitometry. The results obtained are shown in the following Table 4.

Table 4

| Specimen | Copolymer Added with Gelatin | Relative Sensitivity | Fog |
| --- | --- | --- | --- |
| Control | None | 100 | 0.12 |
| 5 | Copolymer VII | 112 | 0.12 |

As is evident from the results contained in the above Table 4, when the copolymer of this invention is used together with gelatin in the formation of silver halide crystals, the degree of fog appearing in photographic film containing the copolymer in combination with gelatin is almost same as that of the control specimen, and further the sensitivity of the emulsion containing the copolymer of the invention is higher than that of the gelatin only emulsion.

EXAMPLE 3

Specimens were prepared in quite the same way to the preparation of the control specimen in Example 1, with the exception that each of the following compounds was added after the addition of the 4-hydroxy-6-methyl-1,3,3a,7-tetrazaindene and before the addition of the saponin, in an amount of 10% by weight of the gelatin already contained in the emulsion. The thus prepared specimens were subjected to sensitometry. The results obtained are shown in the following Table 5.

Table 5

| Sensitometry Specimen | Compound | Relative Sensitivity | Fog |
| --- | --- | --- | --- |
| Control | Inert Gelatin | 100 | 0.12 |
| 6 | Copolymer III | 112 | 0.11 |
| 7 | Copolymer IV | 115 | 0.13 |
| 8 | Copolymer V | 110 | 0.12 |
| 9 | Copolymer VI | 118 | 0.09 |
| 10 | Copolymer VII | 116 | 0.09 |
| Comparison | Copolymer II-1 | 95 | 0.10 |
| Comparison | Copolymer II-2 | 110 | 0.13 |

As is apparent from the results contained in the above Table 5, the copolymers of this invention can effectively be added immediately before the coating of the emulsion.

EXAMPLE 4

Using each of the above-described Copolymers VIII and IV, Comparative Copolymer II-2 and inert gelatin as a protective colloid, a silver bromoiodide emulsion was prepared according to a conventional ammonia method as shown below.

| Component A: | |
| --- | --- |
| H₂O | 600 ml |
| Protective Colloid | 10 g |
| KBr | 76 g |
| KI | 12 g |
| Component B: | |
| Silver Nitrate | 100 g |
| 25% Aqueous Ammonia | 90 ml |
| H₂O to make | 200 ml |
| Component C: | |
| Gelatin | 30 g |
| 1N-NaOH | 10 ml |
| 4% KBr | 5 ml |
| H₂O | 250 ml |

The Component A was kept at 40°C to completely dissolve the protective colloid. While stirring, Component B kept at 40°C was added thereto over the course of 15 minutes. The entire amount was digested for 30 minutes at 40°C. Sedimentation and demineralization were carried out with a copolymer of potassium p-vinyl-benzenesulfonate and acryloylmorpholine (as disclosed in U.S. Pat. No. 3,482,980). Component C was then added while keeping at 50°C, and the entire amount was subjected to chemical digestion using a conventional chemical sensitizer (for example, a sensitizer such as sodium thiosulfate, gold sensitiver such as potassium chloroaurate).

The thus manufactured emulsion was applied to a polyethylene terephthalate support for photographic film to produce a photographic material, which was then exposed and developed according to conventional techniques to examine the photographic properties thereof and the condition of dispersion of the silver halide therein. The results obtained are shown in the following Table 6 wherein the "sensitivity" is a "relative sensitivity" which is the maximum sensitivity attained when fog is controlled at a constant degree (0.1), in relation to the sensitivity, as "100", of the control sample where inert gelatin only was used as the protective colloid, and the "chemical digestion time" is the "time for chemical digestion" required for attaining this sensitivity, and the "dispersion condition" is the result obtained upon observation of the developed silver with a microscope.

Table 6

| Specimen | Protective Colloid | Relative-Sensitivity | Chemical Digestion Time (min) | Dispersion |
|---|---|---|---|---|
| Control | Inert Gelatin | 10 | 60 | good |
| 11 | Copolymer VIII | 110 | 45 | good |
| 12 | Copolymer IX | 121 | 45 | good |
| Comparison | Copolymer II-2 | fog | 30 | poor |

These results demonstrate that, when the copolymers of this invention are used, high sensitivity can be obtained in a short period of digestion time, and further, the dispersion condition of the silver halide is good.

While the invention has been described in detail and with reference to specific embodiments thereof, it will be apparent to one skilled in the art that various changes and modifications can be made therein without departing from the spirit and scope thereof.

What is claimed is:

1. A silver halide photographic emulsion containing an amphoteric copolymer which comprises:

a. 0.5 to 30 mole % of cation-site containing repeating units of the formula (I)

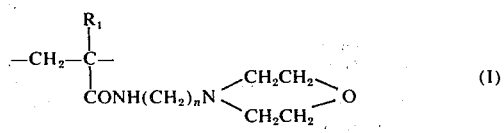

wherein $R_1$ represents a hydrogen atom or a methyl group and $n$ is 1, 2, 3 or 4:

b. 0.5 to 30 mole % of anion-site containing repeating units of the formula (II)

wherein $R_2$ represents a hydrogen atom or a methyl group, and X represents

—COOM, —SO$_3$M or —COO(CH$_2$)$_m$SO$_3$M, where M is a cation and $m$ is 3 or 4; and c. the balance of repeating units of the formula (III)

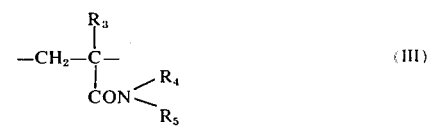

where $R_3$ represents a hydrogen atom or a methyl group, $R_4$ and $R_5$ each represents a hydrogen atom, a lower alkyl group or a substituted alkyl group thereof wherein the substituents are selected from hydroxy, halogen, alkoxy, aryl, alkoxycarbonyl, oxo, acyloxy, acyl, acylamino or cyano, with the proviso that when one of $R_4$ or $R_5$ is a group containing a tertiary carbon atom the other of $R_4$ or $R_5$ is a hydrogen atom.

2. The photographic emulsion as claimed in claim 1, wherein the intrinsic viscosity of said copolymer is about 0.3 to 5 in a 1% sodium chloride aqueous solution at 30°C.

3. A photographic emulsion as claimed in claim 2, wherein the limiting viscosity of said copolymer is 0.5 to 2.5.

4. The photographic emulsion as claimed in claim 1, wherein said copolymer is

N-(morpholinylmethyl)acrylamido-acrylamido-acrylic acid, N-(morpholinylmethyl)acrylamido-acrylamido-methacrylic acid, N-(morpholinylmethyl)acrylamido-acrylamido-N,N-dimethylacrylamido-acrylic acid, N-acrylamido-methylmorpholinyl-β-aminopropionate-betaine-methacrylamido-acrylic acid, N-(morpholinylmethyl)-methacrylamido-acrylamido-acrylic acid, N-(morpholinylmethyl)-methacrylamido-methacrylamido-acrylic acid, N-(morpholinylmethyl)-methacrylamido-N,N-dimethylmethacrylamide-acrylic acid N-methacrylamidomethyl, N-methylmorpholinyl-p-toluenesulfonate-acrylamido-acrylic acid, N-(2-morpholinylethyl)acrylamido-acrylamido-acrylic acid, N-(2-morpholinylethyl)-acrylamido-acrylamido-methacrylic acid, N-acrylamidoethyl-morpholinyl-β-aminoacetate-betain-methacrylamido-acrylic acid, N-(3-morpholinylpropyl)-acrylamido-acrylamido-acrylic acid, N-(3-morpholinylpropyl)-acrylamido-acrylamido-methacrylamido-methacrylic acid, N-(3-morpholinylpropyl)acrylamido-acrylamido-N,N-dimethylacrylamido-acrylic acid, N-(3-morpholinylpropyl)acrylamido-N-(2-hydroxyethyl)-acrylamido-acrylamido-methacrylic acid or N-(3-morpholinylpropyl)-acrylamido-N-(1,1-dimethyl-3-hydroxybutyl)acrylamido-acrylamido-acrylic acid.

5. The photographic emulsion as claimed in claim 1, wherein said cation-site containing repeating units are in the form of a quaternary salt or a betaine.

6. The photographic emulsion as claimed in claim 1, wherein said cation-site containing repeating unit has the general formula

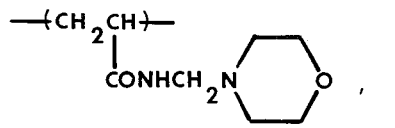

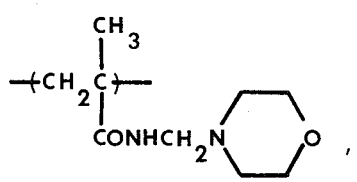

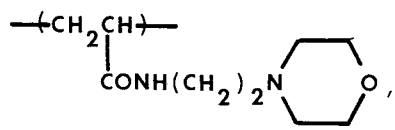

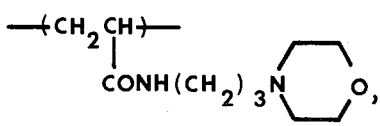

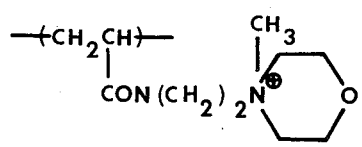

or

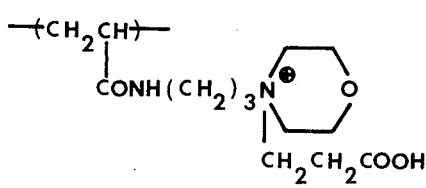

wherein said anion-site containing repeating unit has the formula

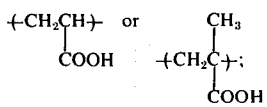

and wherein said repeating unit of the formula (III), has the formula

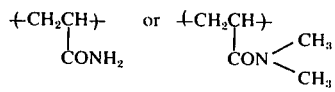

7. The photographic emulsion as claimed in claim 1, wherein said anion-site of said copolymer is acrylic acid and said cation-site of said copolymer is N-(morpholinomethyl)-acrylamide.

8. The photographic emulsion as claimed in claim 1, wherein said anion-site of said copolymer is acrylic acid and said cation-site of said copolymer is N-(2-morpholinoethyl)-acrylamide.

9. The photographic emulsion as claimed in claim 1, wherein said anion-site of said copolymer is acrylic acid and said cation-site of said copolymer is N-(3-morpholinopropyl)-acrylamide.

10. The photographic emulsion as claimed in claim 1, wherein the molecular weight of said copolymer ranges from about 10,000 to 1,000,000.

11. The photographic emulsion as claimed in claim 1, wherein said amphoteric copolymer comprises 1.0 to 20 mole % of said cation-site containing units and 1.0 to 20 mole % of said anion-site containing units.

12. The photographic emulsion as claimed in claim 1, wherein said emulsion includes gelatin.

13. The photographic emulsion as claimed in claim 9, including gelatin at a level of from 95 to 30% by weight of the colloid in said emulsion.

14. A silver halide photographic material containing

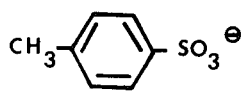

at least one photographic emulsion as claimed in claim 11.

15. A process for preparing photographic emulsions comprising incorporating the amphoteric copolymer as claimed in claim 1 into said emulsion during the formation of the silver halide particles of said emulsion.

16. A process for preparing photographic emulsions comprising incorporating the amphoteric copolymer as claimed in claim 1 into a photographic emulsion after formation of the silver halide particles of said emulsion but before application of said emulsion to a support.

* * * * *